Nov. 9, 1971 W. MEYER 3,618,353
METHOD FOR WELDING TWO SHEET METAL EDGES
Filed Feb. 10, 1969

INVENTOR:
Werner Meyer

ATTORNEYS

United States Patent Office 3,618,353
Patented Nov. 9, 1971

3,618,353
METHOD FOR WELDING TWO SHEET METAL EDGES
Werner Meyer, Hannover, Germany, assignor to Kabel- und Metallwerke Gutehoffnungshutte Aktiengesellschaft, Hannover, Germany
Filed Feb. 10, 1969, Ser. No. 798,085
Claims priority, application Germany, Feb. 8, 1968, P 16 52 819.1
Int. Cl. B21d 7/02
U.S. Cl. 72—220     3 Claims

ABSTRACT OF THE DISCLOSURE

For edge-to-edge welding of two metal sheets, one of them is bent up (folded) along the edge by a roller.

---

The invention relates to welding of sheet metal and more particularly to a method and an apparatus preparing sheet metal for producing a welding seam of great strength as between the edges of two metal sheets.

Upon welding sheet metal along their edges the strength of the material, particularly in the welding seam is usually reduced as compared with the strength of the basic metal sheets themselves. This reduction in strength is the result of differences in the material structure of the material in the seam, on one hand, and in the basic material, on the other hand. This difference in structure produces a metallurgic discontinuity. Furthermore, the load bearing cross section is smaller in the seam than in the basic sheet material. As a consequence, the seam may tear as the seam is subjected to tension during subsequent processing.

For example, it is known to manufacture pipes or tubes by using longitudinal seam welding. Particularly, several metal tapes are deformed to form a pipe and are welded to each other. The equipment for making such pipes produces tension and the seam may tear, interrupting the manufacturing process. It has been suggested to orient the welding seam oblique to the main direction of tension in order to increase mechanical strength of the seam itself. However, the resulting increase in strength is not very significant. Furthermore, in case of a steep inclination of the seam, i.e., if the seam runs at an acute angle to the direction of the principal tension producing force, the welding heat causes penetration holes at the two acutely oriented sheet metal edges. As a consequence, the two sheets to be welded to each other have to be hemmed in order to eliminate penetration holes because overheated zone is often the area where cracks may begin to form.

In addition, it has been suggested to provide an additive to be melted into the welding seam during the welding process. This way, a reduction in load bearing cross section in the welding seam is prevented rather satisfactorily. However, it is a disadvantage of such method that additive and sheet material have to agree exactly in their metallurgic structure. Otherwise, the mechanical strength is increased little or not at all. For example, upon welding copper or aluminum sheets, even few impurities or small parts of damaging alloy elements cause the welding seam to crack, or at least to exhibit embrittlement.

The difficulties and disadvantages outlined in the foregoing are obviated in accordance with the present invention having such elimination and obviation as its principal object. In accordance with the invention, it is suggested to fold a narrow portion of one of the sheets along an edge thereof and prior to welding. The folded portion is to extend at least approximately at right angles to the plane of extension of the unfolded sheet. An edge of the other sheet is then welded against the transversely extending or upstanding portion of the sheet which was subjected to the preparatory folding step. The transversely extending edge portion is then smelted into the welding seam during the welding process.

The narrow upstanding portion of the sheet thus serves as supply for an "additive" of the edge-to-edge welding process. The method, in accordance with the present invention, thus ensures that "additive" and basic material have precisely the same metallurgic structure, as a portion of the sheet material itself is used as welding "additive." Therefore, impurities and/or incompatible alloying elements of an additive, will not enter the welding zone in this case thus cannot weaken the welding seam.

Subsequent to the welding, fine finishing of the welding seam is not necessary unless such fine finishing is desired for particular reasons having to do with particular processing. For example, the welding seam can be pressed flat subsequent to welding. Flat pressing of a welding seam exhibits, in addition, the advantage that the mechanical strength of the welding seam is actually increased additionally.

Measurements have shown that a joint between two sheets made in accordance with the principles of the invention and using subsequent flat pressing, has the mechanical strength of up to 97% of the strength of the sheets themselves. Without flat pressing the strength of the welding seam is smaller by a few percentage points but still considerably higher than in case of the known methods. In addition, the inventive method has the advantage that an additive does not have to be part of the inventory equipment, and it was also found that welding, preceded by preparation in accordance with the present invention, can be practiced much simpler, safer and easier than without such preparation.

The mechanical strength of the welding seam can be increased even further by orienting the welding seam at an angle of preferably 30 to 45 degrees to the direction of the principal tension force which may occur during a continuous operating process of which welding is just one step. However, hemming of the sheets parallel to the principal direction of force is still necessary in order to eliminate the inevitable penetration holes. Nevertheless, it was found that the hemming does not have to be as extensive as in the known method. The total strength in such a welding seam is actually only increased by 1%, so that this step for increasing the mechanical strength of the welding seam does not have to be used always, but only in those special cases where the increase by one percentage point is a significant improvement.

In case the thickness of the welding seam is immaterial for further processing, selection of folding height is not critical. It is merely neceary to make sure that the height of the folded edge in direction transverse to the extension of the sheet is not too short, so that sufficient quantities of "additive" is available. It was found that if the height of the folded edge is approximately equal to the thickness of the sheet, a sufficient amount of material is available for smelting into the welding zone, and the results are satisfactory. As a consequence, the additional sheet metal consumed in the welding seam is very small, and if the height of the fold is selected in accordance with this rule, very favorable dimensions of the welding seam are actually established for any subsequent processing.

Devices for folding edges are generally known to include a plunger having rectangular or triangular front face. The sheet to be folded is, at least in the last phase of deforming, frictionally engaged by the plunger and bent up. For providing smooth motion therein, the plunger runs in a guide and the sides of the plunger facing the guide will be covered with an oily or greasy film for lubrication. As the plunger frictionally engages the metal during folding, oil and grease is deposited thereon. Moreover, during retraction of the plunger, after the edge has been bent, the present upstanding edge bears resiliency against the plunger and will scrape off the lubrication film. Therefore, lubricant deposits on top of the former edge. Unless removed, the lubricant will be included in the welding seam which, in turn, becomes porous and may even have holes. Hence, inclusion of lubricant in the welding seam has to be avoided, and it is necessary, therefore, to meticulously clean the edge prior to welding.

Another effect of scraping of the bent edge along the plunger is that metallic particles may mix with the lubricant. If that mixture remains on the plunger subsequent edge bending and folding of another sheet may produce scratches thereon, which is detrimental to the production of a uniform welding seam. Finally, it was found that such frictionally operating sliding plungers require very large forces to bend a sheet edge.

These disadvantages of the known folding and edge bending devices are eliminated in accordance with the present invention. The sheet edge folding and bending device suggested to be used includes several known elements such as a table with a clamping device and a guide for a vertically reciprocating plunger. However, the plunger differs structurally from the known plungers in that presently the plunger is provided with a roller at the side facing the edge to be bent and folded and projecting towards that edge. The plunger does not slidingly engage its guide at that side, but the roller rolls thereon, and over a narrow portion of the sheet adjacent the edge which extends into the path of the roller, for folding and bending that portion up.

Lubrication of that guiding surface is not required so that lubricant will not be deposited on the folded edge. Moreover, as the entire folding process is, in effect, a rolling process, the resulting friction forces are very low so that the overall forces required to provide folding of the sheet narrowly along an edge are relatively small and the edge will not be scratched.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings in which:

Figure 1:
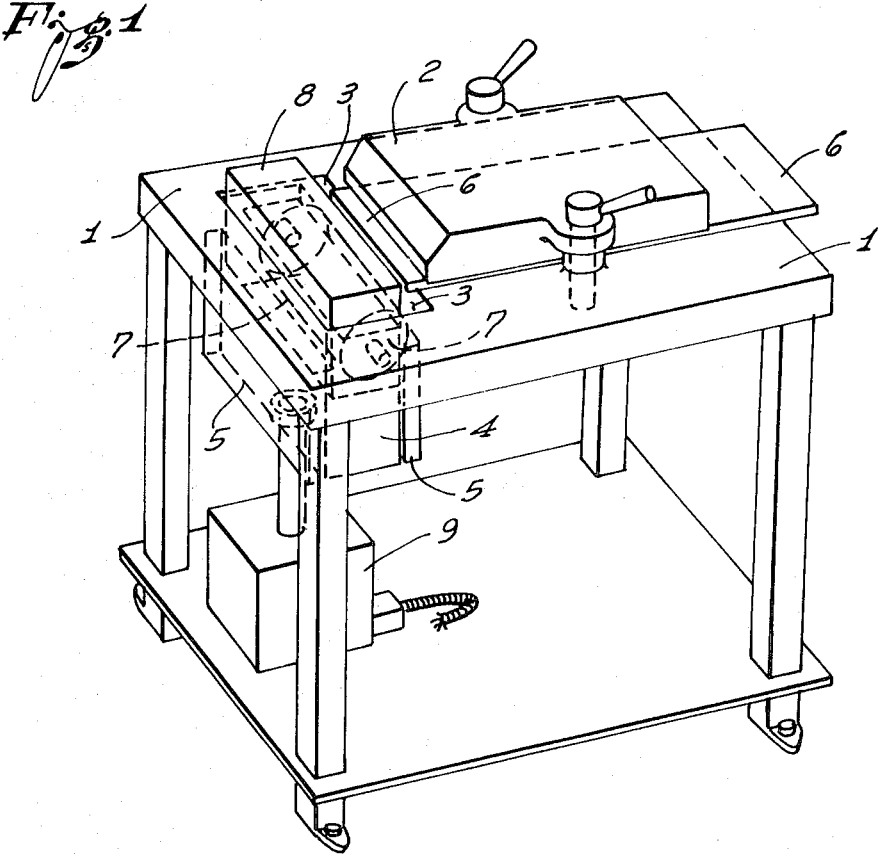
FIG. 1 illustrates schematically, in part, a device for bending and folding the edge of a metal sheet in accordance with the principles of the invention.

There is an edge folding table 1 with a clamping device 2 for holding and maintaining a piece 6 of sheet metal in position. The table 1 has an aperture 3 which is the upper end of a hollow guiding element 5 for guiding a plunger 4. The sheet 6 projects partially across aperture 3 to the extent of the desired upward bending. Plunger 4 is provided with an adjustable or exchangeable stop 8 against which the unfolded edge of sheet 6 is made to abut. The position of stop 8 thus determines how far sheet 6 is permitted to extend across aperture 3 for adjustment of the particular height of folding.

A hydraulic press 9 is coupled to plunger 4 to control up and down movement thereof. Side 4a of plunger 4 facing the edge of the sheet 6 to be folded is somewhat receded from the adjacent wall 5a of guiding element 5. Plunger 4 carries a roller 7 which projects beyond side 4a for rolling about a horizontal axis on that wall surface 5a.

Figure 2:
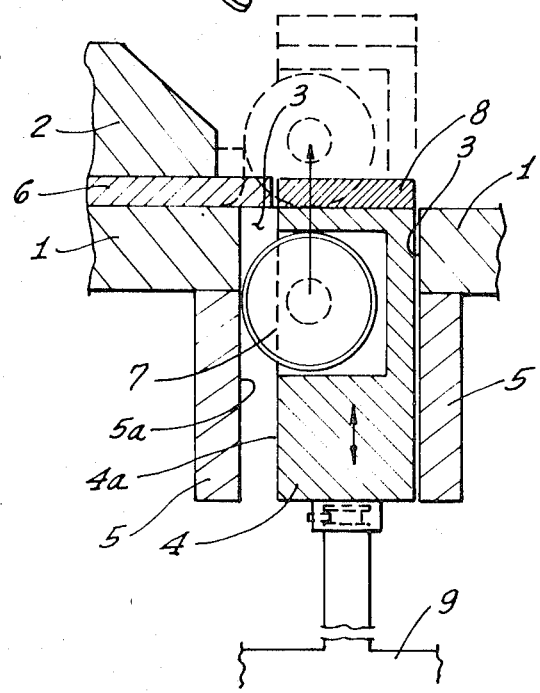
FIG. 2 is a cross section through a portion of the device shown in FIG. 1.
Figure 3:
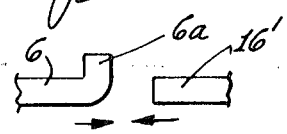
FIG. 3 illustrates a side view of a portion of two sheets to be edge-to-edge welded, one of the sheets having been prepared in accordance with the principles of the present invention.

As plunger 4 is moved in up direction by operation of hydraulic press 9, roller 7 rolls on the side of the guide facing it. As the roller engages the lower surface portion of sheetmetal 6 where projecting into the path of the roller, the sheet is bent up by the rolling operation, as shown in FIG. 2. As plunger 4 retracts roller 7 rolls over the bent edge. As shown in FIG. 3, the now upstanding portion 6a of sheet 6 defines a new edge for welding to the unbent edge of another sheet such as 16.

The invention is not limited to the embodiments described above, but all changes and modifications thereof not constituting departures from the spirit and scope of the invention are intended to be included.

I claim:

1. Apparatus for preparing a metal sheet for welding to another sheet, the sheets having edges along which they are to be welded together, comprising:

a table with a rectangular aperture in its horizontal supporting surface having two long edges, for supporting the one sheet in particular position to overhang one of the aperture edges for about the thickness of the sheet;

clamping means acting on the sheet from above and recessed from the edge of the sheet for about twice the sheet thickness;

a roller disposed for moving in the aperture, for rolling the one sheet along an edge thereof in the up direction and transverse to the plane of extension of the sheet to fold a narrow portion of the sheet up along the overhanging edge thereof and in rolling contact therewith to cause the narrow portion to extend transverse to the plane of extension of the sheet adjacent the fold; and means for supporting the roller for the roller to project towards the one edge of the table aperture and bearing with the rear surface against the other edge of the aperture for reaction to the folding to be reacted into the table just below and parallel to the supporting surface thereof; the supporting means having dimensions across the aperture to just fit through the aperture across the width dimension thereof between the two edges as the roller projects for the rolling on the one edge.

2. An apparatus as set forth in caim 1, the means for supporting including a table with a clamping holder for particularly positioning the one sheet, the means for rolling including a plunger guided for motion transverse to the table, there being guiding means defining a vertical chute merging into aperture in the table, and a roller in the plunger rolling on the guiding means as well as over the edge as extending at the guiding means.

3. An apparatus as set forth in claim 2, there being replaceable stops on the plunger for particularly positioning the edge in relation to the guide to determine the height of the fold produced by rolling.

References Cited

UNITED STATES PATENTS

| | | | |
|---|---|---|---|
| 45,226 | 10/1864 | Chambers | 72—220 |
| 48,516 | 7/1865 | Chambers | 72—220 |
| 195,627 | 9/1877 | Meikle | 72—214 |
| 419,156 | 1/1896 | McGiehan | 72—214 |
| 696,816 | 4/1902 | Herden | 72—214 |
| 709,754 | 9/1902 | Ditchfield | 72—220 |
| 713,894 | 11/1902 | MacFarren | 72—220 |
| 974,173 | 11/1910 | Morgan | 72—220 |
| 997,709 | 7/1911 | Seery | 72—214 |
| 1,827,927 | 10/1931 | Barber | 72—214 X |
| 1,963,724 | 6/1934 | Taylor | 72—220 |

JOHN F. CAMPBELL, Primary Examiner

R. B. LAZARUS, Assistant Examiner

U.S. Cl. X.R.

72—214